US008961359B2

(12) United States Patent
Floro et al.

(10) Patent No.: US 8,961,359 B2
(45) Date of Patent: Feb. 24, 2015

(54) PLANET CARRIER AND CLUTCH HOUSING

(75) Inventors: Justin Floro, Dunlap, IL (US); Thomas D. Koch, Green Valley, AZ (US); Michael Gross, Peoria, IL (US); Perry G. Cruce, Marquette Heights, IL (US); Anthony R. Johnson, Washington, IL (US); Clifford Garrison, Peoria, IL (US); Lawrence A. Rutledge, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 365 days.

(21) Appl. No.: 13/569,139

(22) Filed: Aug. 7, 2012

(65) Prior Publication Data

US 2014/0041981 A1 Feb. 13, 2014

(51) Int. Cl.
*F16H 57/08* (2006.01)

(52) U.S. Cl.
USPC ........................................... 475/331; 475/159

(58) Field of Classification Search
USPC .................................................. 475/159, 331
See application file for complete search history.

(56) References Cited

U.S. PATENT DOCUMENTS

| 3,527,121 A * | 9/1970 | Moore ........................... 475/331 |
| 3,653,279 A * | 4/1972 | Sebern ............................ 475/33 |
| 4,640,152 A * | 2/1987 | Quick et al. ................... 475/116 |
| 6,758,786 B2 * | 7/2004 | Lepelletier .................... 475/296 |
| 7,654,929 B2 * | 2/2010 | Kimes et al. ................... 475/331 |
| 8,062,168 B2 * | 11/2011 | Ziemer et al. .................. 475/331 |
| 8,628,449 B1 * | 1/2014 | Burgman et al. .............. 475/331 |
| 2003/0087720 A1 * | 5/2003 | Lepelletier .................... 475/282 |
| 2003/0100399 A1 * | 5/2003 | Hayabuchi et al. ........... 475/331 |
| 2004/0077455 A1 * | 4/2004 | Huber et al. ................... 475/331 |
| 2006/0089228 A1 * | 4/2006 | Nakagawa et al. ........... 475/331 |
| 2006/0287152 A1 * | 12/2006 | Bishop et al. ................. 475/159 |
| 2009/0253545 A1 * | 10/2009 | Diosi et al. .................... 475/159 |

FOREIGN PATENT DOCUMENTS

JP          2005147284 A       6/2005

* cited by examiner

*Primary Examiner* — Derek D Knight
(74) *Attorney, Agent, or Firm* — Baker Hostetler

(57) ABSTRACT

A planet carrier and clutch housing for a transmission is provided. The planet carrier and clutch housing includes a first deck, a second deck, an annulus and a plurality of planet carrier posts. The first deck has an inner rim, an outer rim, planet shaft bores and control oil bores. The second deck has an inner rim, an outer rim, a piston recess disposed between the inner and outer rims, planet shaft bores and control oil bores fluidly coupled to the piston recess. The annulus extends from the second deck. The planet carrier posts connect the first deck to the second deck, and each post has a control oil bore fluidly coupling respective control oil bores in the first and second decks. The inner surface of each second deck planet shaft bore may include a groove to receive a planet shaft seal.

20 Claims, 12 Drawing Sheets

PLANET CARRIER AND CLUTCH HOUSING

TECHNICAL FIELD

The present disclosure relates to transmissions. More particularly, the present disclosure relates to a planet carrier and clutch housing for a transmission.

BACKGROUND

Off-highway vehicles, such as, for example, track type tractors, track loaders, wheel loaders, motor graders, etc., are used to perform many different earthmoving tasks. In order to effectively perform these tasks, these vehicles require a power source and drive train that provide significant power to the ground over a range of operating conditions. The power source may be an engine such as, for example, a diesel engine, a gasoline engine, a natural gas engine, etc., that generates a power output. The drive train for a typical off-highway vehicle generally includes a transmission and a final drive.

The transmission may be connected to the engine via a torque converter, and converts the power output from the engine to useful power by controlling torque, speed and direction. The transmission may be a hydraulically-controlled planetary design that includes planetary gear sets and hydraulic clutches that allow the vehicle to work at different speeds while keeping the engine within a desired operating range. The final drive may be coupled to the transmission via a differential, and applies the driving force to the tracks or wheels. Rotating hydraulic clutches for planetary transmissions are located between the planetary gear trains to which they are coupled, which increases axial length, number of parts, complexity and cost.

One known planetary gear set for an automobile automatic transmission includes an inner sun gear, an outer sun gear (ring gear) and three planetary gears which are mounted in a planetary gear carrier using roller bearings and three planetary gear bolts, each of which includes axial and radial bores to supply lubrication oil to the planetary gears (US 2009/0253545 A1). The rear plate of the planetary gear carrier is connected to an outer disk carrier of a clutch of a shift element, while both the front and rear plates include pressure oil ducts and through-bores, respectively, to supply pressurized oil to the clutch piston. A sturdier, more compact and more efficient design is desirable, i.e., one that reduces axial length, number of parts, complexity, cost, etc.

SUMMARY

One aspect of the present disclosure advantageously provides a planet carrier and clutch housing for a transmission that includes a first deck, a second deck, an annulus and a plurality of planet carrier posts. The first deck has an inner rim defining a central bore, an outer rim, a plurality of planet shaft bores and a plurality of control oil bores. The second deck has an inner rim defining a central bore, an outer rim having a plurality of splines, a piston recess disposed between the inner and outer rims, a plurality of planet shaft bores and a plurality of control oil bores fluidly coupled to the piston recess. The annulus extends from the second deck and includes an inner surface defining a central bore, and an outer surface. The planet carrier posts connect the first deck to the second deck, and each post has a control oil bore fluidly coupling respective control oil bores in the first and second decks.

Another aspect of the present disclosure advantageously provides a planet carrier and clutch assembly for a transmission that includes a planet carrier and clutch housing, a plurality of planet shafts, a plurality of planet gears, a clutch piston and a clutch spring. The planet carrier and clutch housing includes a first deck having a plurality of planet shaft bores and a plurality of control oil bores, a second deck having a piston recess, a plurality of planet shaft bores and a plurality of control oil bores fluidly coupled to the piston recess, an annulus extending from the second deck, and a plurality of planet carrier posts, connected to the first and second decks, each post having a control oil bore fluidly coupling respective control oil bores in the first and second decks. Each planet shaft extends through respective planet shaft bores in the first and second decks, and each planet gear is rotationally coupled to each planet shaft. The clutch piston is movable within the piston recess to engage at least one clutch disk, and the clutch spring is disposed around the annulus to return the piston to a non-engaged position.

A further aspect of the present disclosure advantageously provides a method for actuating the clutch in a planet carrier and clutch assembly that includes a planet carrier and clutch housing with a first deck, second deck and planet carrier posts, planet shafts, planet gears, a clutch piston and a clutch spring. The method includes providing control oil to first deck control oil bores, fluidly coupling the control oil from the first deck control oil bores to second deck control oil bores through planet carrier post control oil bores, fluidly coupling the control oil from the second deck control oil bores to a second deck piston recess, actuating the clutch piston, disposed in the piston recess, using the control oil.

DETAILED DESCRIPTION

Figure 1:
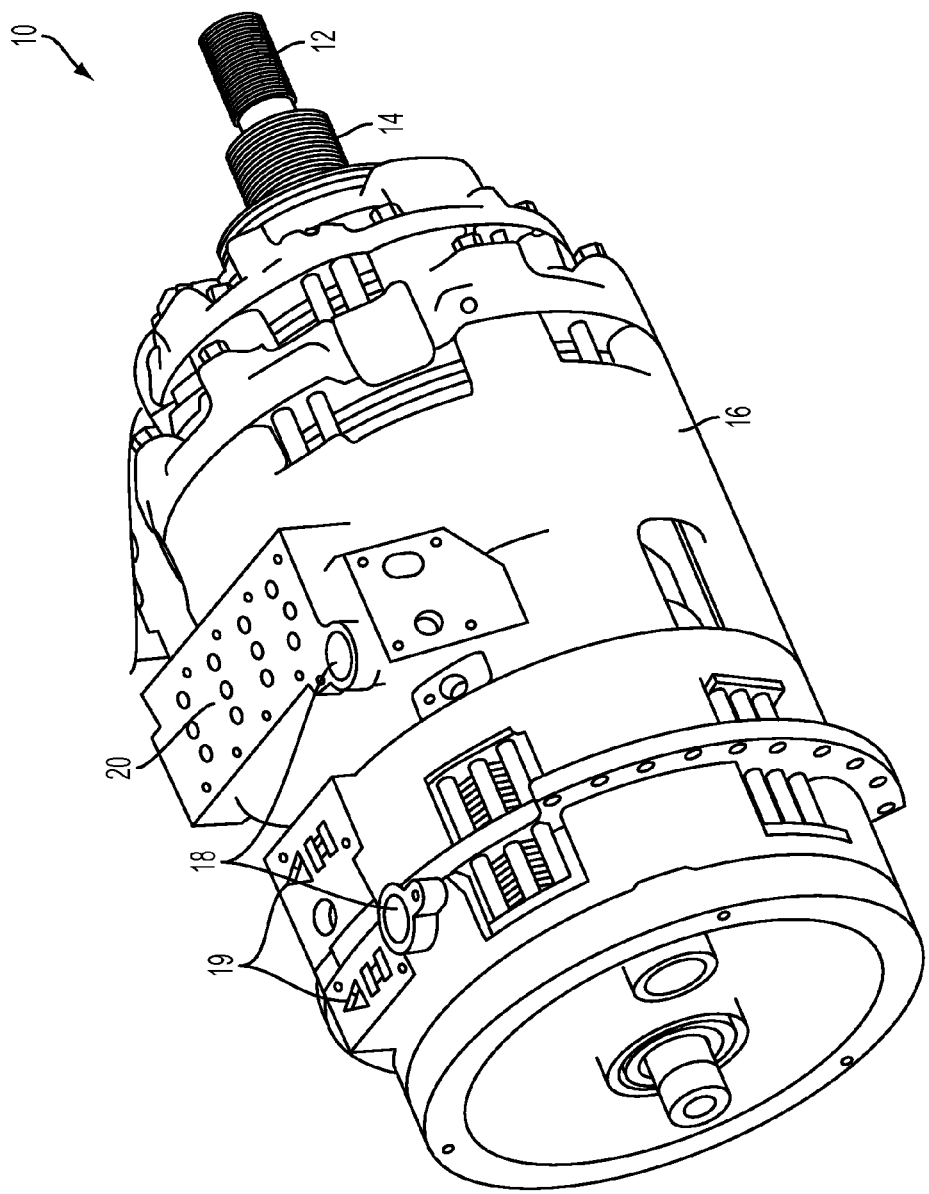
FIG. 1 depicts a perspective view of a transmission, according to an embodiment of the present disclosure.

FIG. 1 depicts a perspective view of a transmission, according to an embodiment of the present disclosure.

Transmission 10 is located within the upper drivetrain of an off-highway vehicle, downstream of the engine and torque converter. Generally, transmission 10 receives torque and speed from the torque converter, and outputs torque and speed in a particular direction of rotation. Downstream of transmission 10 is the steering input and/or differential, and the final drive which usually includes further gear reductions. Transmission 10 may be housed within a larger enclosure (not shown), and includes an input shaft 12, an output shaft 14, a housing 16, hydraulic fluid interfaces 18, 19, 20, etc. Housing 16 may include various housing assemblies that are connected together using bolts, etc. In this embodiment, input shaft 12 and output shaft 14 protrude from one end of housing 16, while input shaft 12 also protrudes from the other end of housing 16. The orientation of transmission 10 relative to the longitudinal axis of the vehicle depends upon various design considerations, as is known in the art.

Figure 2:
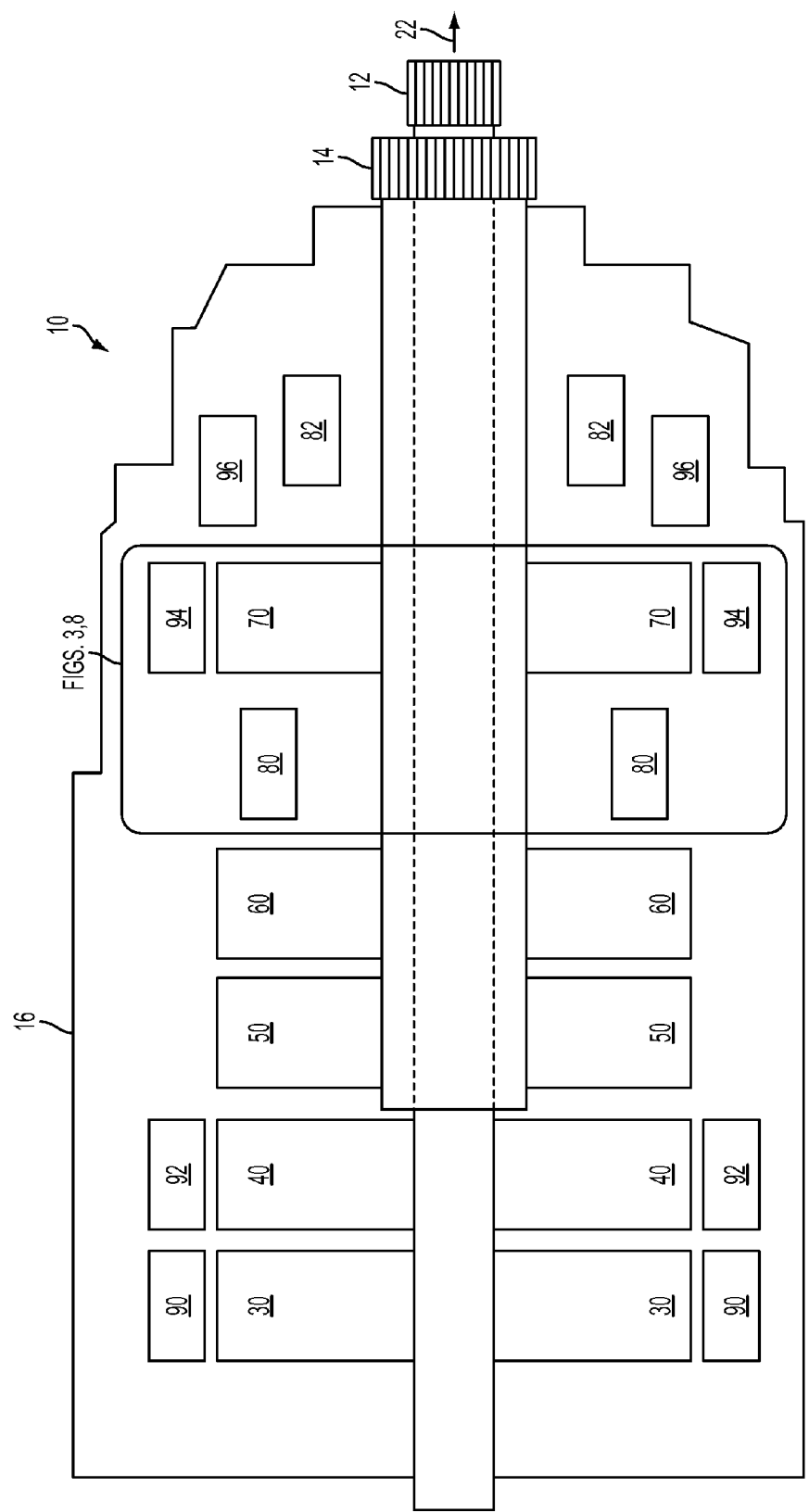
FIG. 2 presents a schematic diagram of a transmission, according to an embodiment of the present disclosure.

FIG. 2 presents a schematic diagram of a transmission, according to an embodiment of the present disclosure.

Transmission 10 is generally cylindrical in shape, and is schematically represented in cross section in FIG. 2. Housing 16 is stationary, and is attached, either directly or indirectly, to the vehicle chassis. Input shaft 12 extends from one end of housing 16 to the other, while output shaft 14 surrounds a portion of input shaft 12. Each shaft is axially aligned along rotational axis 22, and is rotationally supported by bearings, such as, e.g., ball bearings, sleeve bearings, etc. Gears, mounted on the ends of each shaft, couple input and output shafts 12, 14 to other components of the drivetrain. The torque, speed and rotation direction of output shaft 14 is set by engaging combinations of stationary clutches 90, 92, 94, 96 and rotating clutches 80, 82. These clutches connect various components of planetary gear trains 30, 40, 50, 60, 70 to one another, as well as to the input shaft 12 and output shaft 14. Stationary clutches 90, 92, 94, 96, rotating clutches 80, 82, and planetary gear trains 30, 40, 50, 60, 70 are cylindrical in shape, are axially aligned along rotational axis 22, and are rotationally supported by ball bearings, sleeve bearings, etc. These components are represented in FIG. 2 as rectangles disposed above and below rotational axis 22.

Transmission 10 includes both forward and reverse gears or gear ratios. Generally, planetary gear trains 30, 40 and stationary clutches 90, 92 determine the rotation direction of output shaft 14 (and, to some extent, the gear ratio), while planetary gear trains 50, 60, 70, stationary clutches 94, 96 and rotating clutches 80, 82 determine the gear ratio of output shaft 14. Engaging various combinations of stationary clutches 90, 92, 94, 96, and rotating clutches 80, 82 sets the rotation direction and gear ratio of output shaft 14 and, in this embodiment, three clutches are engaged (closed) to select the rotation direction and gear ratio of output shaft 14, while three clutches remain disengaged (open). One stationary clutch is always engaged to set the rotation direction, so, in order to set the rotation direction and gear ratio of output shaft 14, three stationary clutches may be engaged, two stationary clutches and one rotating clutch may be engaged, or one stationary clutch and two rotating clutches may be engaged.

Each planetary gear train includes a sun gear, a planet carrier and a ring gear (not shown in FIG. 2 for clarity). The planet gears of the planet carrier mesh with the sun gear and the ring gear, and with intermediate planet gears of the same planet carrier if intermediate planet gears are included in the planetary gear assembly. The sun gear, planetary carrier, planet gears, and ring gear may all rotate together simultaneously. Alternately, each of the sun gear, planet carrier, and ring gear may be held stationary. The planetary gear train receives an input rotation at a first speed and generates a corresponding output rotation at a second speed. The change in rotational speed between the input and the output depends upon the number of teeth in the sun gear, the plurality of planet gears (if multiple planet gear sets) mounted to the planet carrier, and the ring gear. The change in rotational speed also depends upon the gear that is used to receive the input rotation, the gear that is selected to provide the output rotation, and which gear, if any, is held stationary.

In addition to the temporary connections provided by stationary clutches 90, 92, 94, 96 and rotating clutches 80, 82, the elements of planetary gear trains 30, 40, 50, 60, 70 may be permanently connected to other components of transmission 10 as well. For example, sun gears may be connected to input shaft 12 or output shaft 14, a stationary or rotating clutch, or a planet carrier of an adjacent planet gear train. Planet carriers may be connected to a stationary or rotating clutch, or the sun gear or planet carrier of an adjacent planet gear train. Ring gears may be connected to a stationary or rotating clutch, or the planet carrier of an adjacent planet gear train. In this context, a permanent connection is a direct or indirect attachment between two components of transmission 10, via a mechanical link, a common structural element, etc., such that these components do not rotate with respect to one another. When a stationary clutch is engaged, the planetary gear train element connected to the stationary clutch does not move or rotate with respect to housing 16. Similarly, when a rotating clutch is engaged, the transmission components connected to the rotating clutch do not rotate with respect to one another. In other words, when a stationary or rotating clutch in engaged, the transmission components attached thereto are temporarily connected and do not rotate with respect to one another.

Stationary clutches 90, 92, 94, 96 have an upstream side connected to a rotating component of transmission 10, and a downstream side that is permanently connected to housing 16. Rotating clutches 80, 82 have an upstream side and a downstream side, each connected to a rotating component of transmission 10.

The connections for an embodiment of transmission 10 with several forward gears and several reverse gears will now be described; other configurations are also contemplated by the present disclosure.

With respect to planetary gear train 30, the sun gear is connected to input shaft 12, the planet carrier is connected to stationary clutch 90, and the ring gear is connected to the planet carrier of planetary gear train 40. With respect to planetary gear train 40, the sun gear is connected to input shaft 12, the planet carrier is connected to the ring gear of planetary gear train 30 and the planet carrier of planetary gear train 50, and the ring gear is connected to stationary clutch 92. With respect to planetary gear train 50, the sun gear is connected to output shaft 14 and to the planet carrier of planetary gear train 60, the planet carrier is connected to the planet carrier of planetary gear train 40, and the ring gear is connected to the upstream side of rotating clutch 80 and the planet carrier of planetary gear train 70. With respect to planetary gear train 60, the sun gear is connected to the sun gear of planetary gear train 70, the planet carrier is connected to the sun gear of planetary gear train 50, and the ring gear is connected to the downstream side of rotating clutch 80. With respect to planetary gear train 70, the sun gear is connected to the sun gear of planetary gear train 60, the upstream side of rotating clutch 82 and stationary clutch 96, the planet carrier is connected to the upstream side of rotating clutch 80 and the ring gear of planetary gear train 50, and the ring gear is connected to stationary clutch 94. The upstream side of rotating clutch 82 is connected to output shaft 14, while the downstream side of rotating clutch 82 is connected to the sun gear of planetary gear train 70 and stationary clutch 96.

In this embodiment, the first forward gear is selected by engaging stationary clutches 92, 96 and rotating clutch 80, while the first reverse gear is selected by engaging stationary clutches 90, 96 and rotating clutch 80. The second through fifth forward gears may be selected by engaging stationary clutch 92 in combination with rotating clutches 80, 82 (second forward gear), rotating clutch 80 and stationary clutch 94 (third forward gear), rotating clutch 82 and stationary clutch 94 (fourth forward gear) and stationary clutches 94, 96 (fifth gear), respectively. The second through fourth reverse gears may be selected by engaging stationary clutch 90 in combination with rotating clutches 80, 82 (second forward gear), rotating clutch 80 and stationary clutch 94 (third forward gear), rotating clutch 82 and stationary clutch 94 (fourth forward gear), respectively. In an alternative embodiment, a fifth reverse gear may also be implemented. Generally, various numbers of forward and reverse gears are contemplated by the present disclosure.

Planetary gear train 70 and rotating clutch 80 will now be discussed with respect to FIGS. 3-12. Advantageously, a housing for rotating clutch 80 has been incorporated into the planet carrier of planetary gear train 70, forming an integrated planet carrier and clutch housing and assembly that is simpler, sturdier, more compact and more efficient than previous designs.

Figure 3:
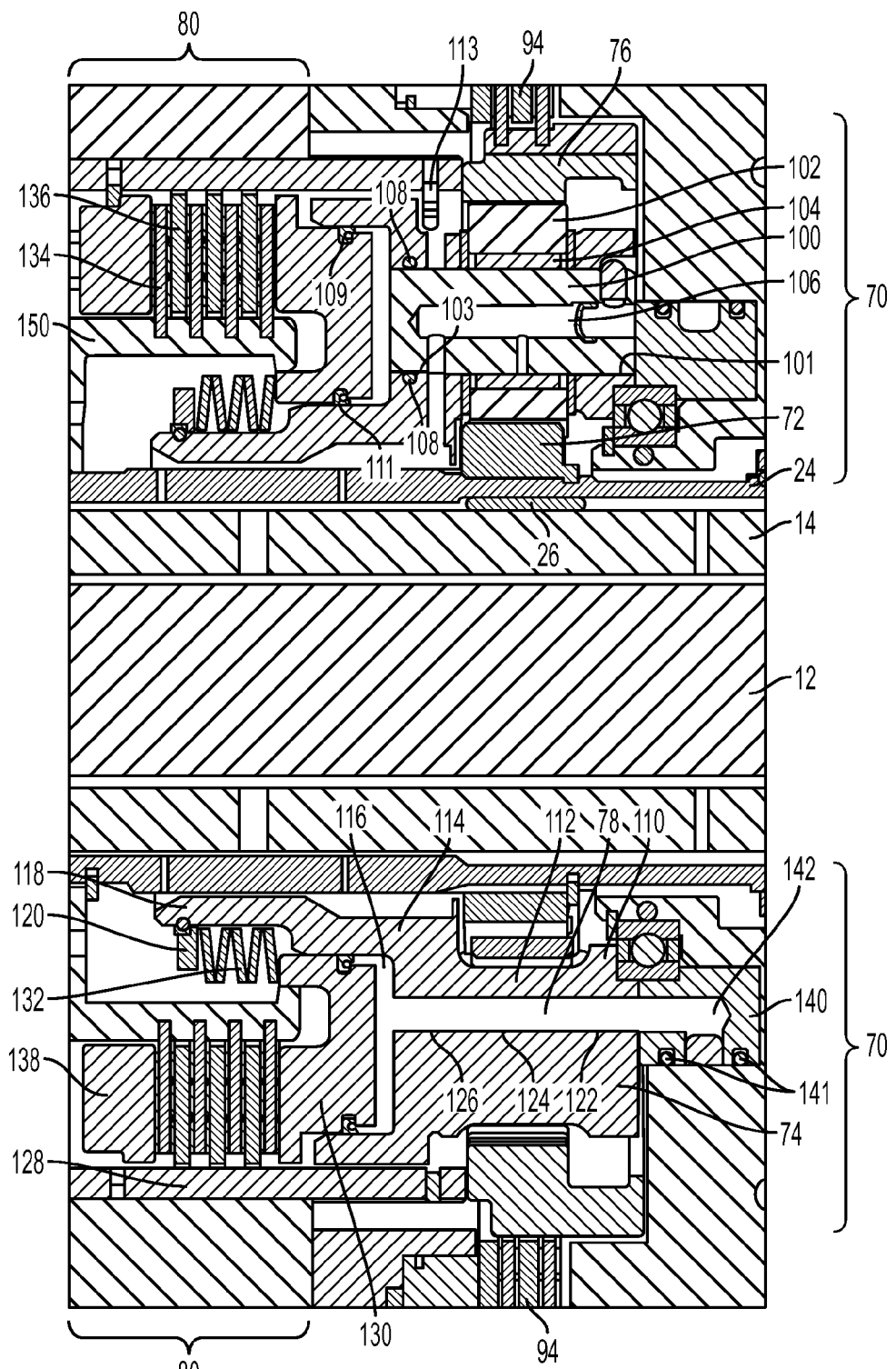
FIG. 3 depicts a partial cross sectional view of the transmission schematically represented in FIG. 2, according to an embodiment of the present disclosure.

FIG. 3 depicts a partial cross sectional view of the transmission schematically represented in FIG. 2, according to an embodiment of the present disclosure. Input shaft 12 and output shaft 14 are disposed in the center of FIG. 3, while planetary gear train 70 and rotating clutch 80 are disposed above and below rotational axis 22. Stationary clutch 94 is partially visible above and below planetary gear train 70.

Planetary gear train 70 generally includes sun gear 72, planet carrier and clutch housing 74 and ring gear 76. A sun shaft 24, rotatably supported by sleeve bearing 26, may connect sun gear 72 to other planetary members. Planet carrier and clutch housing 74 includes a first circular platform or deck 110, a second circular platform or deck 114 with a clutch piston recess 116, an annulus 118 extending from the second deck 114, and several planet carrier posts 112 connecting the first deck 110 to the second deck 114. Preferably, first deck 110, planet carrier posts 112, second deck 114 and annulus 118 are integrally formed by casting, forging, CNC machining, etc., using iron, steel or other appropriate metal or alloy. Annulus 118 forms a housing for rotating clutch 80.

First and second decks 110, 114 include coaxial planet shaft bores 101, 103, respectively, in which planet shafts 100 are disposed. A planet gear 102 is rotatably coupled to each planet shaft 100 via planet bearing 104, and axial and radial lubricating oil bores 106 may be disposed within each planet shaft 100. The planet shaft bore 103 extends through the second deck 114 to piston recess 116, and an o-ring seal 108, disposed within seal groove 107, prevents control oil from migrating out of the piston recess 116. A dowel pin, or similar device, prevents rotation of each planet shaft 100.

Rotating clutch 80 includes clutch piston 130, clutch spring 132, clutch disks 134, clutch plates 136, reaction plate 138 and clutch hub 150. Several clutch springs, or a clutch spring pack, may also be used, and retaining plate 120 secures clutch spring 132 in place. Clutch disks 134 are interleaved with clutch plates 136. Piston 130 is slidingly disposed within the piston recess 116, and seals 109, 111 prevent control oil from migrating out of the piston recess 116. Tubular coupler 128 is attached to the second deck 114 of the planetary carrier and clutch housing 74 via a splined connection, and lock ring 113 can prevent slippage. Other connection mechanisms are also contemplated. Reaction plate 138 and clutch plates 136 are attached to tubular coupler 128, while disks 134 are attached to clutch hub 150, which may be connected to other planetary members. When rotating clutch 80 is engaged, planetary carrier and clutch housing 74 is connected to, and rotates with, other planetary members.

A seal carrier 140 may be attached to the first deck 110 using bolts (not shown) cooperating with bolt holes 121 in first deck 110; other known connection mechanisms may also be used. Seal carrier 140 restrains planet shafts 100 and provides control oil to rotating clutch 80 via a control oil passageway 78 that passes through the planet carrier and clutch housing 74. Seals 141 prevent hydraulic control oil from leaking into the housing. Control oil passageway 78 fluidly couples control oil bore 142 to piston recess 116 via respective control oil bores 122, 124, 126 in first deck 110, planet carrier posts 112 and second deck 114, respectively.

Piston 130 is depicted in an engaged position.

Figure 4A:
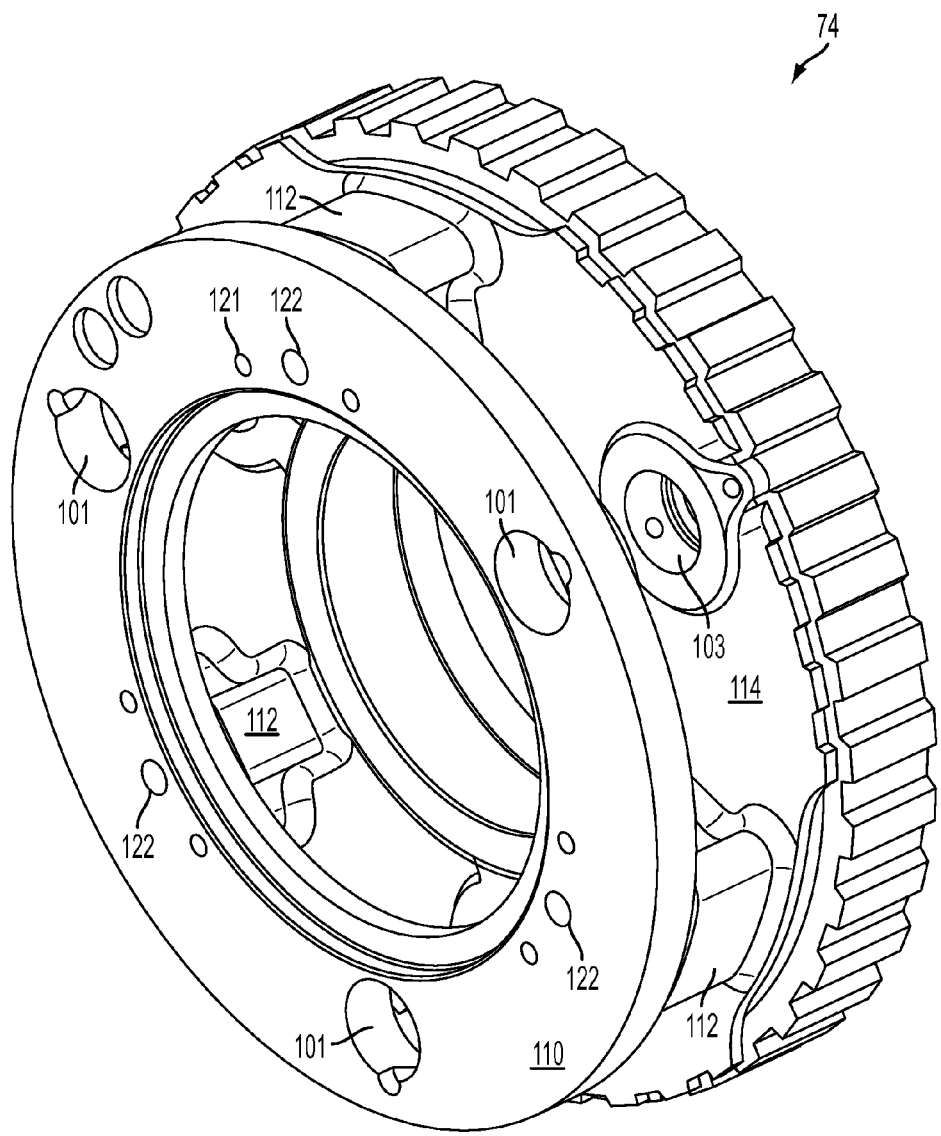
FIGS. 4A and 4B present front and rear perspective views, respectively, of the planet carrier and clutch housing depicted in FIG. 3.
Figure 4B:
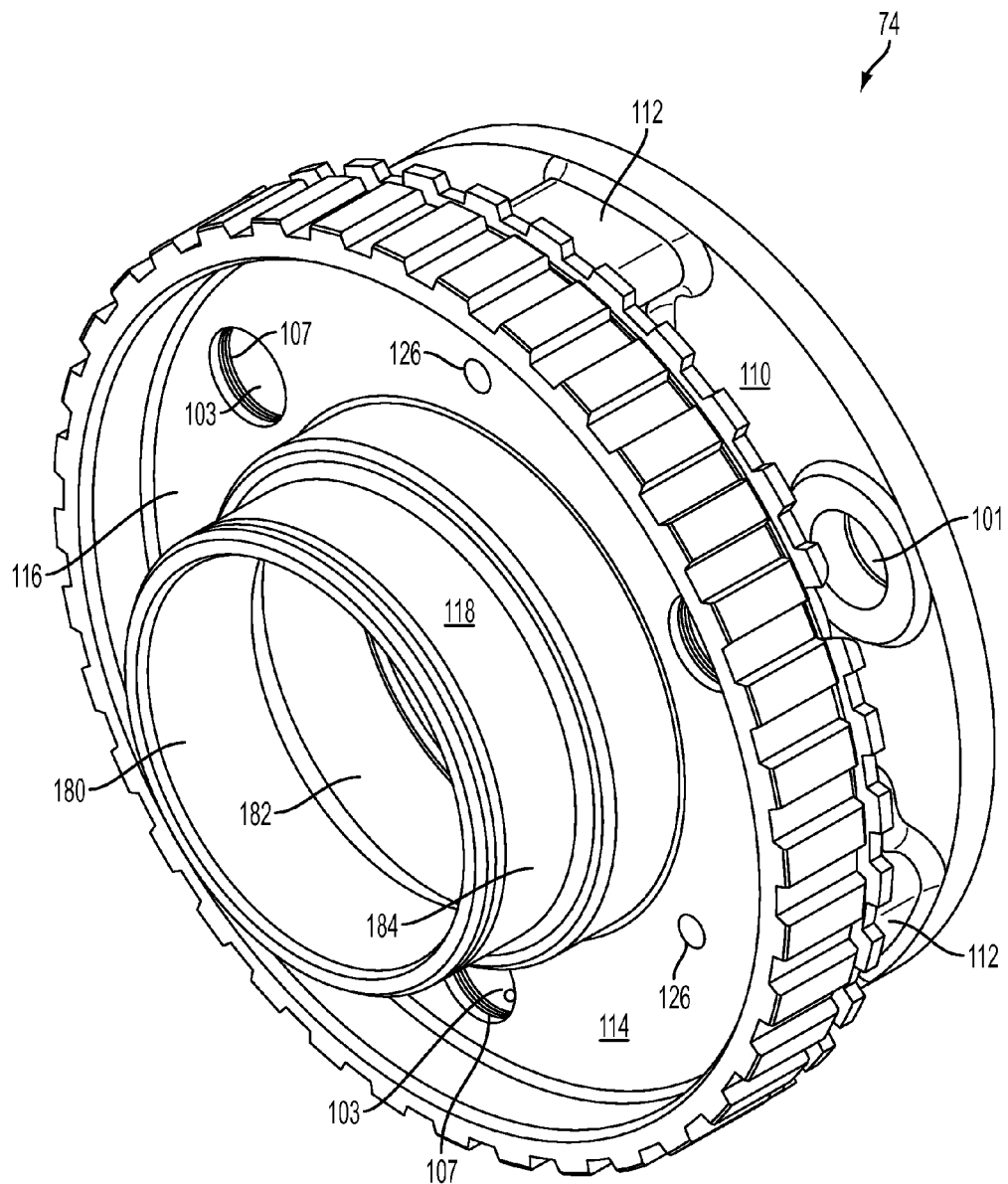
Figure 5:
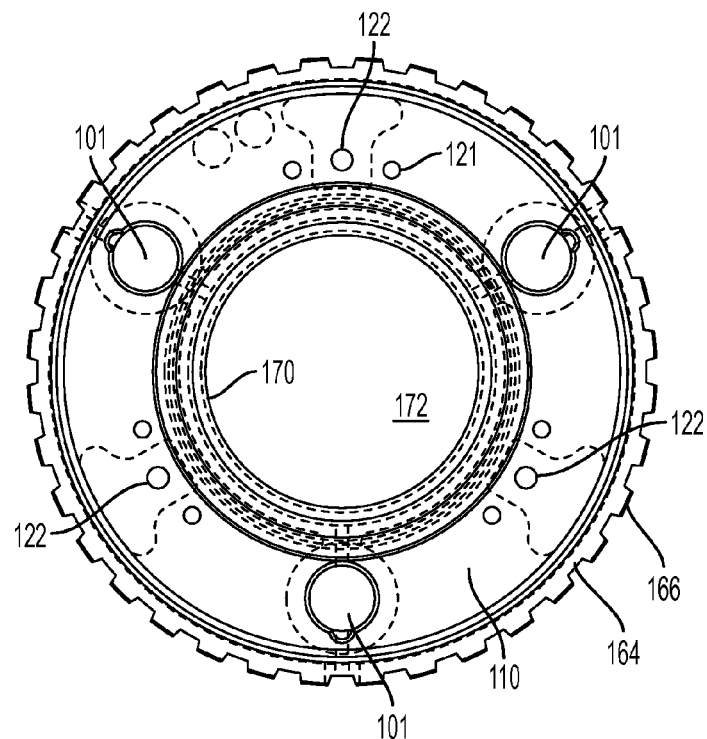
FIGS. 5 and 6 present front and rear views, respectively, of the planet carrier and clutch housing of FIGS. 4A and 4B.
Figure 6:
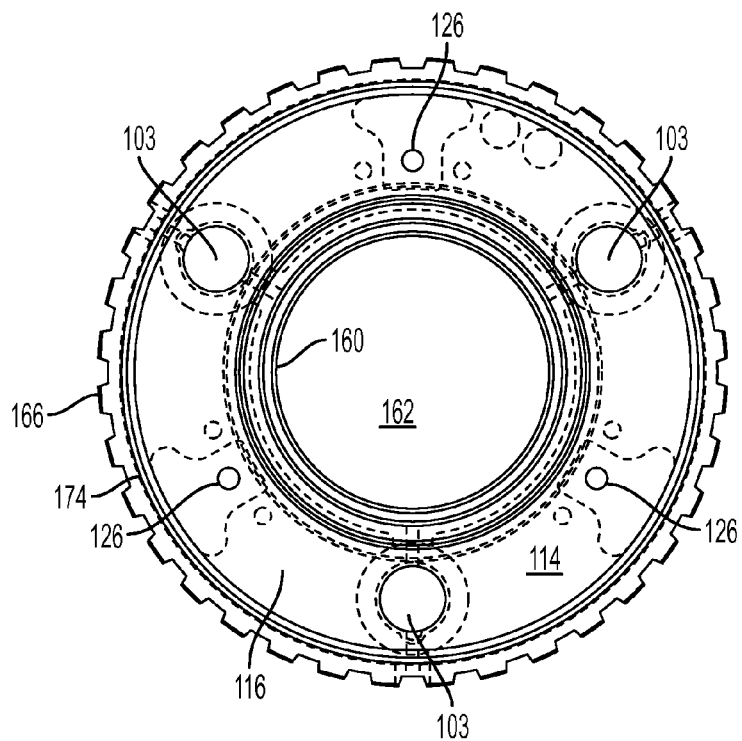
Figure 7:
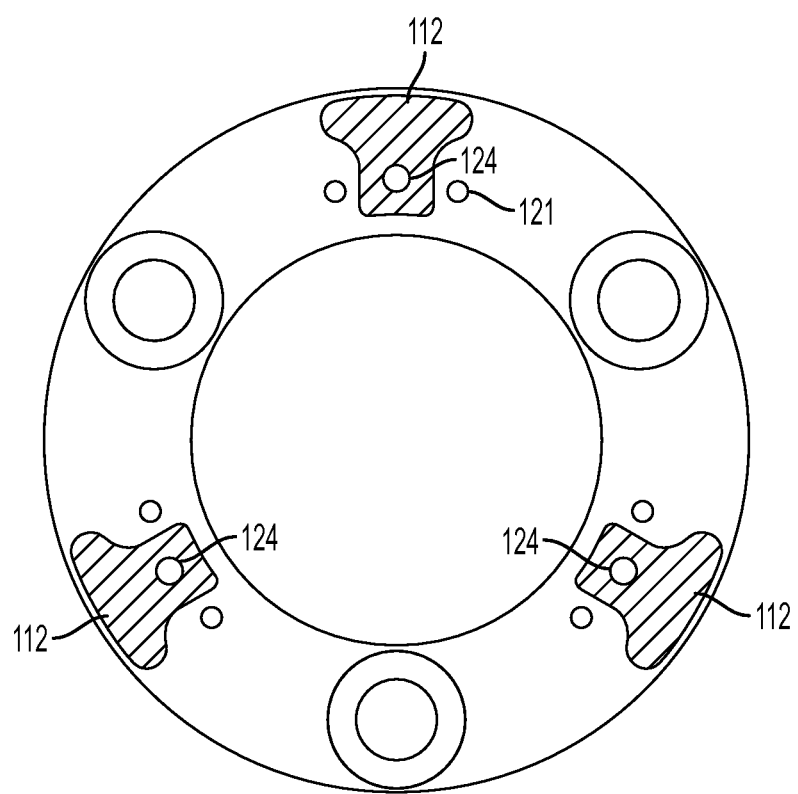
FIG. 7 presents a cross section view of the planet carrier and clutch housing of FIGS. 4A and 4B passing through the center of the planet carrier posts.

FIGS. 4A and 4B present front and rear perspective views, respectively, of the planet carrier and clutch housing depicted in FIG. 3. FIGS. 5 and 6 present front and rear views, respectively, of the planet carrier and clutch housing of FIGS. 4A and 4B. FIG. 7 presents a cross section view of the planet carrier and clutch housing of FIGS. 4A and 4B passing through the center of the planet carrier posts.

As described above, planet carrier and clutch housing 74 includes a first circular platform or deck 110, a second circular platform or deck 114 with a clutch piston recess 116, and an annulus 118 extending from the second deck 114 which forms a housing for a rotating clutch. In this embodiment, three planet carrier posts 112 connect the first deck 110 to the second deck 114. First and second decks 110, 114 each include three coaxial planet shaft bores 101, 103, respectively, in which three planet shafts may be disposed. A planet gear may be rotatably coupled to each planet shaft via a planet bearing, and axial and radial lubricating oil bores may be disposed within each planet shaft. The planet shaft bores 103 extend through the second deck 114 to piston recess 116, and an o-ring seal may prevent control oil from migrating out of the piston recess 116.

The second deck 114 has an inner rim 160 defining a central bore 162 and an outer rim 164 with a plurality of splines 166. Piston recess 116 is disposed between inner rim 160 and outer rim 164. The first deck 110 has an inner rim 170 defining a central bore 172, and an outer rim 174 with a diameter that is smaller than the diameter of the outer rim 164 of the second deck 114. The annulus 118 has an inner surface 180 defining a central bore 182, and an outer surface 184 around which a clutch spring may be disposed.

Figure 8:
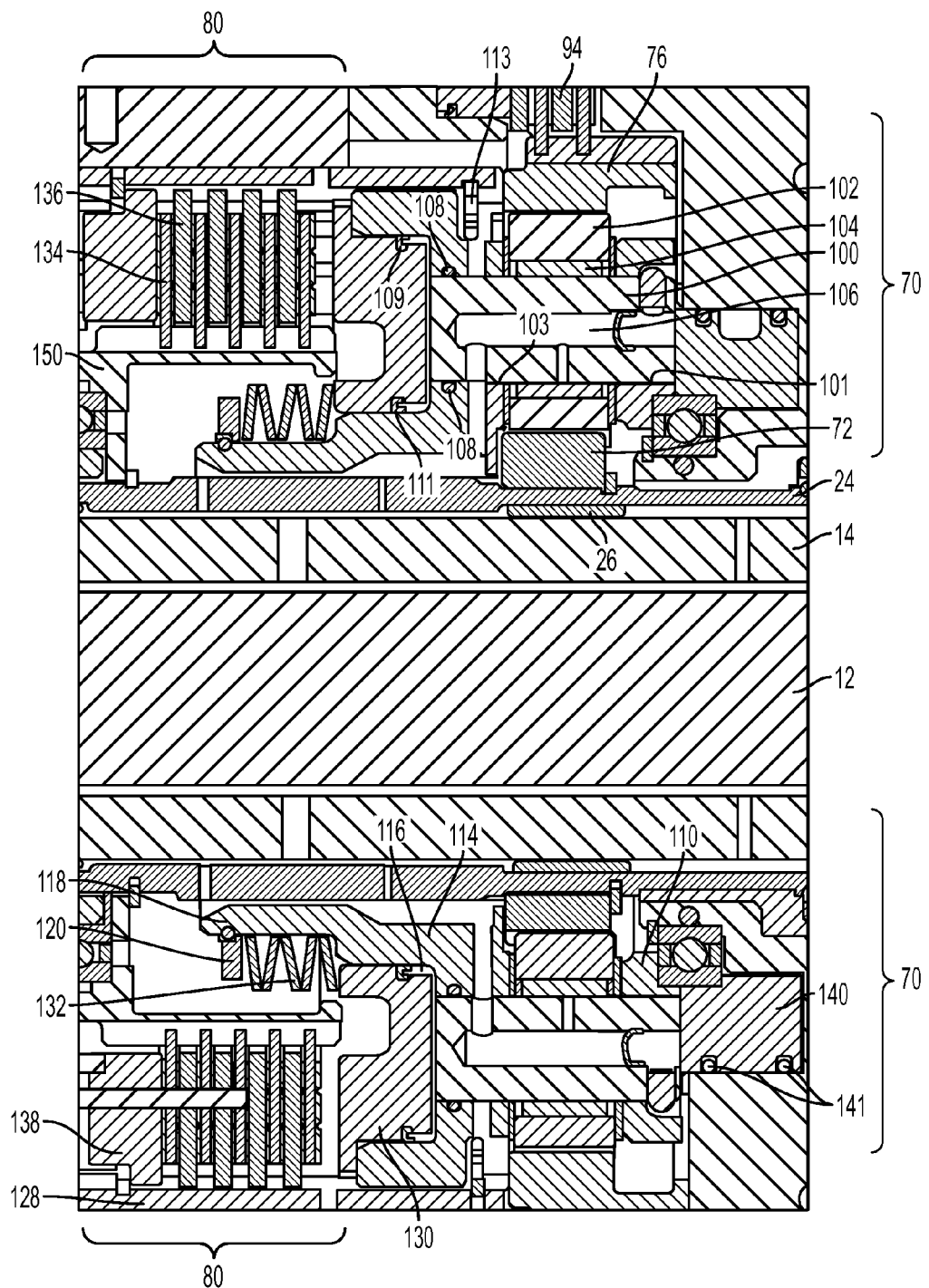
FIG. 8 depicts a partial cross sectional view of the transmission schematically represented in of FIG. 2, according to another embodiment of the present disclosure.

FIG. 8 depicts a partial cross sectional view of the transmission schematically represented in of FIG. 2, according to another embodiment of the present disclosure. Input shaft 12 and output shaft 14 are disposed in the center of FIG. 8, while planetary gear train 70 and rotating clutch 80 are disposed above and below rotational axis 22. Stationary clutch 94 is partially visible above and below planetary gear train 70.

As discussed above, planetary gear train 70 generally includes sun gear 72, planet carrier and clutch housing 74' and ring gear 76. A sun shaft 24, rotatably supported by sleeve bearing 26, may connect sun gear 72 to the sun gear of planetary gear train 50 and to the downstream side of rotating clutch 82, as described above. Planet carrier and clutch housing 74' includes a first circular platform or deck 110, a second circular platform or deck 114 with a clutch piston recess 116, an annulus 118 extending from the second deck 114, and several planet carrier posts 112 connecting the first deck 110 to the second deck 114. Preferably, first deck 110, planet carrier posts 112, second deck 114 and annulus 118 are integrally formed by casting, forging, CNC machining, etc., using iron, steel or other appropriate metal or alloy. Annulus 118 forms a housing for rotating clutch 80.

First and second decks 110, 114 include coaxial planet shaft bores 101, 103, respectively, in which planet shafts 100 are disposed. A planet gear 102 is rotatably coupled to each planet shaft 100 via planet bearing 104, and axial and radial lubricating oil bores 106 may be disposed within each planet shaft 100. The planet shaft bore 103 extends through the second deck 114 to piston recess 116, and an o-ring seal 108, disposed within seal groove 107, prevents control oil from migrating out of the piston recess 116. A dowel pin, or similar device, prevents rotation of each planet shaft 100.

Rotating clutch 80 includes clutch piston 130, clutch spring 132, clutch disks 134, clutch plates 136, reaction plate 138 and clutch hub 150. Several clutch springs, or a clutch spring pack, may also be used, and retaining plate 120 secures clutch spring 132 in place. Clutch disks 134 are interleaved with clutch plates 136. Piston 130 is slidingly disposed within the piston recess 116, and o-ring seals 109, 111 prevent control oil from migrating out of the piston recess 116. Tubular coupler 128 is attached to the second deck 114 of the planetary carrier and clutch housing 74' via a splined connection, and lock ring 113 can prevent slippage. Other connection mechanisms are also contemplated. Reaction plate 138 and clutch plates 136 are attached to tubular coupler 128, while disks 134 are attached to clutch hub 150, which may be connected to the ring gear of planetary gear train 60. When rotating clutch 80 is engaged, planetary carrier and clutch housing 74' is connected to, and rotates with, the ring gear of planetary gear train 60.

A seal carrier 140 may be attached to the first deck 110 using bolts (not shown) cooperating with bolt holes 121 in first deck 110; other known connection mechanisms may also be used. Seal carrier 140 restrains planet shafts 100 and provides control oil to rotating clutch 80 via a control oil passageway 78 (not visible) that passes through the planet carrier and clutch housing 74'. O-ring seals 141 prevent hydraulic control oil from leaking into the housing. Control oil passageway 78 fluidly couples control oil bore 142 (not visible) to piston recess 116 via respective control oil bores 122, 124, 126 (not visible) in first deck 110, planet carrier posts 112 and second deck 114, respectively.

Piston 130 is depicted in a disengaged position.

Figure 9A:
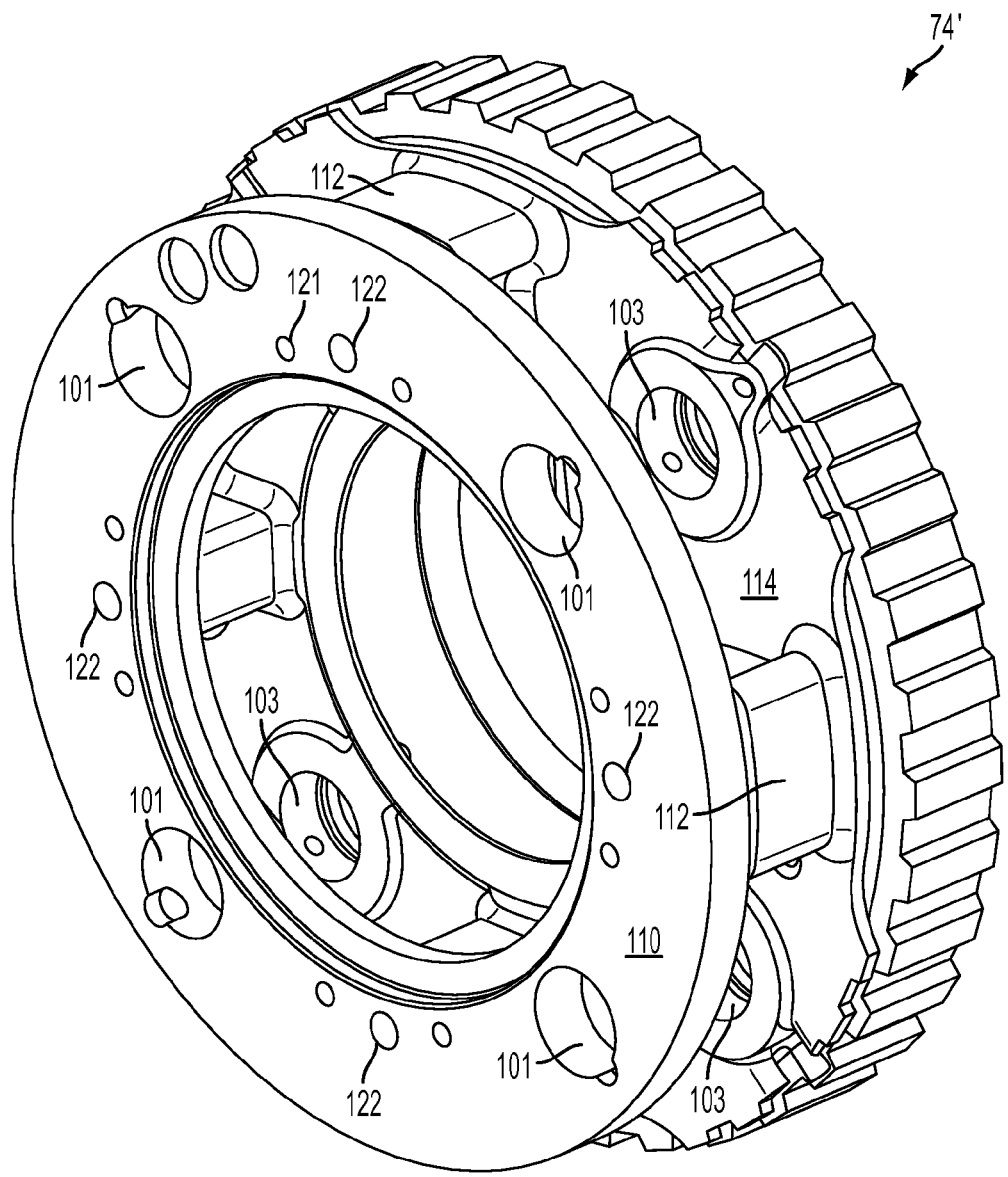
FIGS. 9A and 9B present front and rear perspective views, respectively, of the planet carrier and clutch housing depicted in FIG. 8.
Figure 9B:
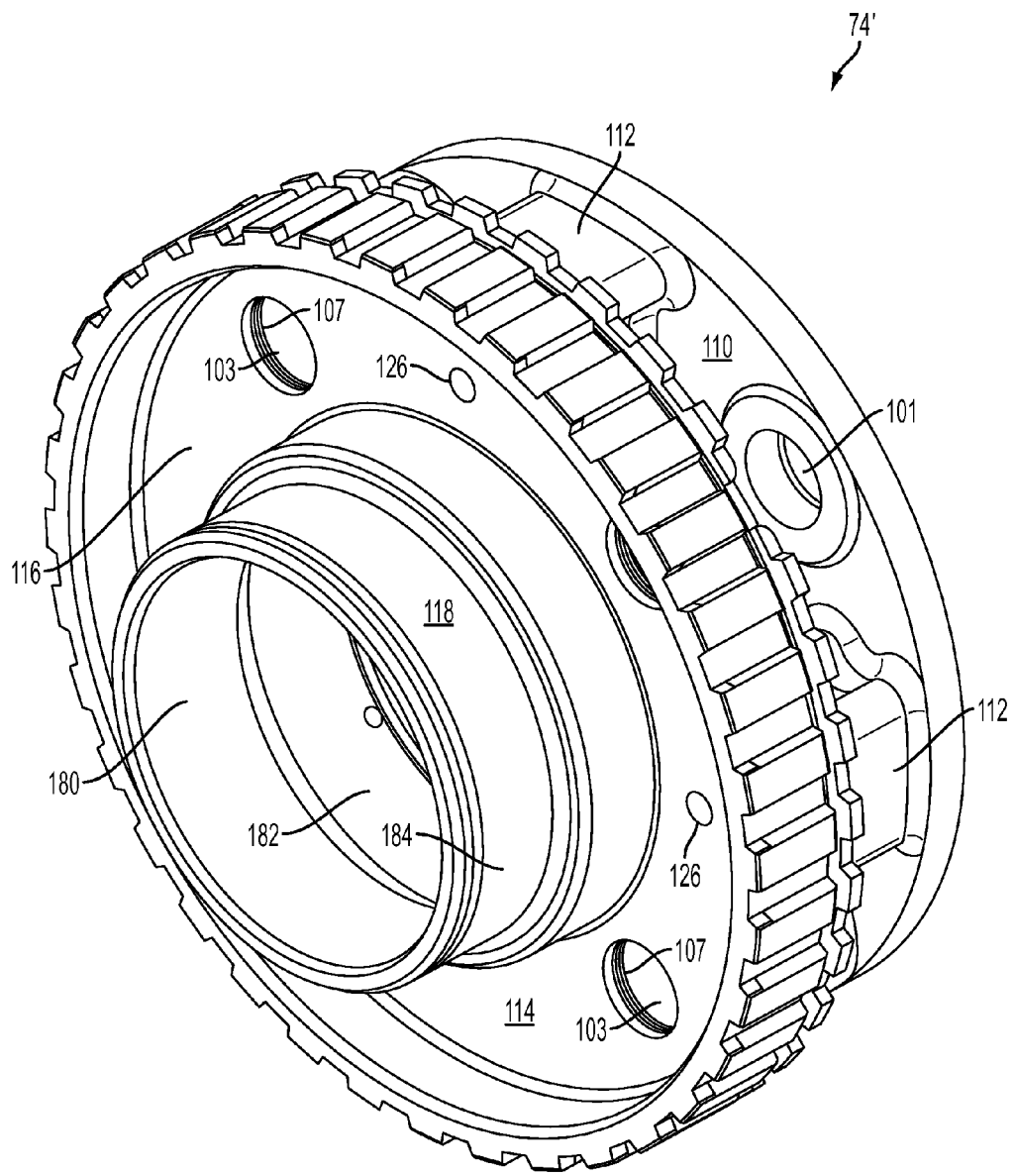
Figure 10:
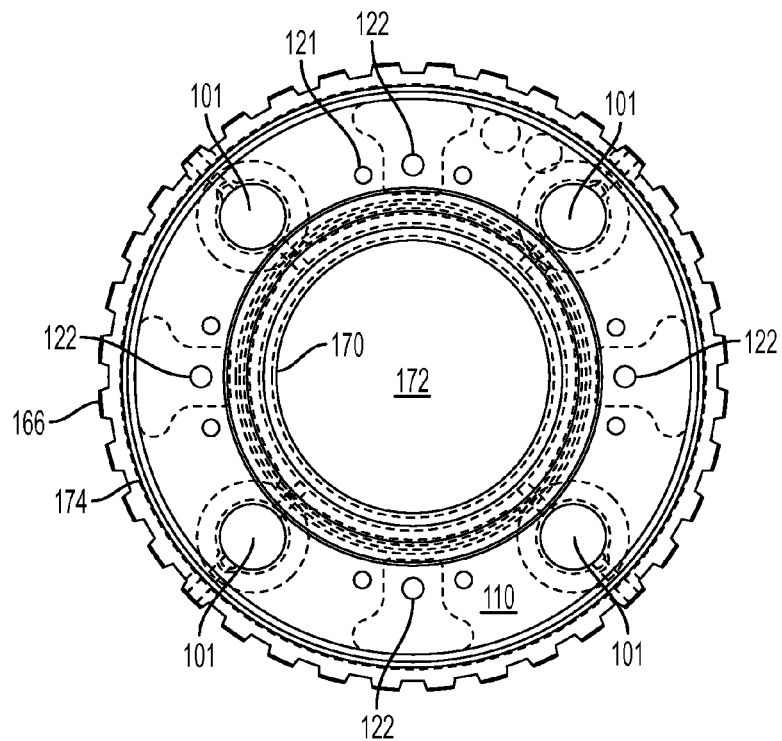
FIGS. 10 and 11 present front and rear views, respectively, of the planet carrier and clutch housing of FIGS. 9A and 9B.
Figure 11:
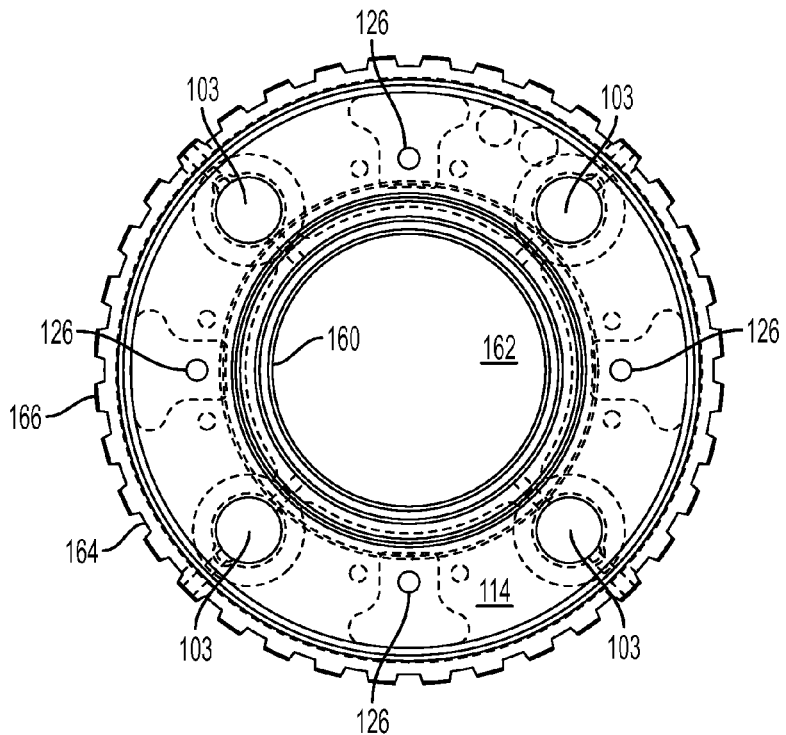
Figure 12:
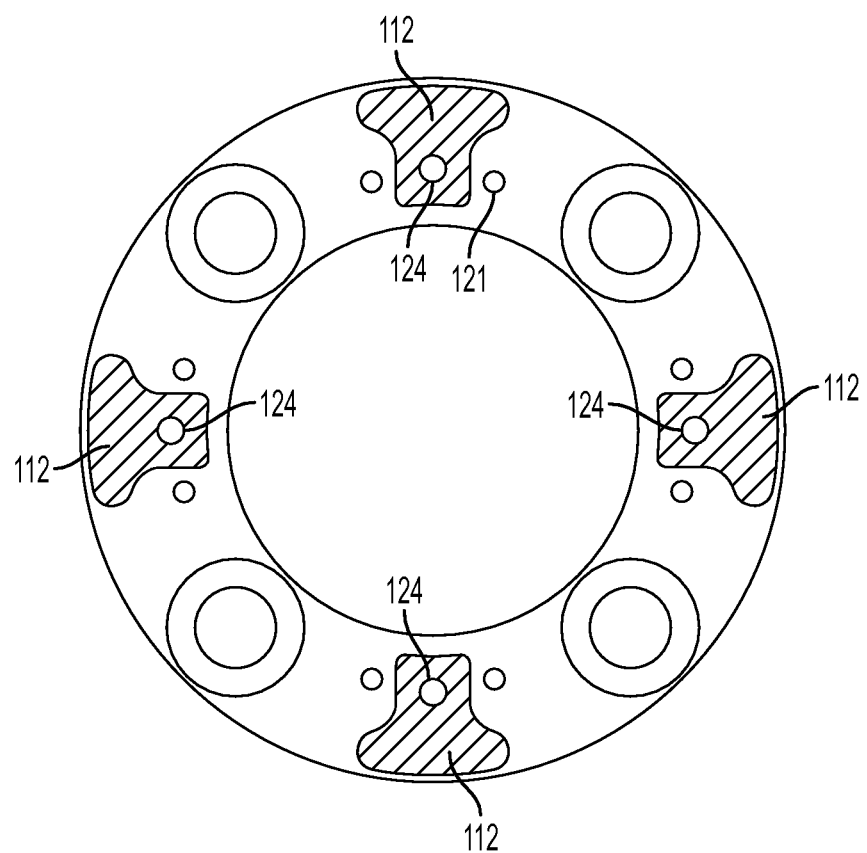
FIG. 12 presents a cross section view of the planet carrier and clutch housing of FIGS. 9A and 9B passing through the center of the planet carrier posts.

FIGS. 9A and 9B present front and rear perspective views, respectively, of the planet carrier and clutch housing depicted in FIG. 8. FIGS. 10 and 11 present front and rear views, respectively, of the planet carrier and clutch housing of FIGS. 9A and 9B. FIG. 12 presents a cross section view of the planet carrier and clutch housing of FIGS. 9A and 9B passing through the center of the planet carrier posts.

Similar to the embodiment discussed above, planet carrier and clutch housing 74' includes a first circular platform or deck 110, a second circular platform or deck 114 that includes a clutch piston recess 116, and an annulus 118 extending from the second deck 114 which forms a housing for a rotating clutch. In this embodiment, four planet carrier posts 112 connect the first deck 110 to the second deck 114. First and second decks 110, 114 each include four coaxial planet shaft bores 101, 103, respectively, in which four planet shafts may be disposed. A planet gear may be rotatably coupled to each planet shaft via a planet bearing, and axial and radial lubricating oil bores may be disposed within each planet shaft. The planet shaft bores 103 extend through the second deck 114 to piston recess 116, and an o-ring seal may prevent control oil from migrating out of the piston recess 116 when assembled.

The second deck 114 has an inner rim 160 defining a central bore 162 and an outer rim 164 with a plurality of splines 166. Piston recess 116 is disposed between inner rim 160 and outer rim 164. The first deck 110 has an inner rim 170 defining a central bore 172, and an outer rim 174 with a diameter that is smaller than the diameter of the outer rim 164 of the second deck 114. The annulus 118 has an inner surface 180 defining a central bore 182, and an outer surface 184 around which a clutch spring may be disposed.

While embodiments of the planet carrier and clutch housing 74 and 74' that support three planet gears and four planet gears, respectively, have been described in detail, other variations are also contemplated by the present disclosure, such as, for example, two planet gears, five planet gears, six planet gears, etc. The number of planet shaft bores and planet carrier posts typically match the number planet gears, however, in alternative embodiments, the number of planet carrier posts may be greater than, or less than, the number of planet gears.

In an alternative embodiment, the planet shaft bore 103 may include an enlarged opening leading into the piston recess 116. A plug, having a diameter slightly larger than the enlarged opening, may be press-fit into the enlarged opening, which prevents control oil from migrating out of the piston recess 116. In this embodiment, o-rings 108 are not used.

In another alternative embodiment, the splined connection between the outer rim of the second deck 114 and the tubular coupler 128 may be replaced by one or more snap rings.

Industrial Applicability

The present disclosure is universally applicable to planetary transmissions for many types of off-highway vehicles, such as, for example, machines associated with industries such as mining, construction, farming, transportation, etc. For example, the vehicle may be an earth-moving machine, such as a track type tractor, track loader, wheel loader, excavator, dump truck, backhoe, motor grader, material handler, etc. Additionally, one or more implements may be connected to the vehicle, which may be used for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, etc.

To engage rotating clutch 80, pressurized control oil is fed from hydraulic lines or passageways in housing 16 to the control oil bore 142 of seal carrier 140, which is fluidly coupled to control oil bores 122, 124 and 126 in first deck 110, planet carrier posts 112 and second deck 114, respectively, and then to piston recess 116 in second deck 114. The pressurized control oil forces piston 130 against the leading clutch disk 134, compressing the interleaved clutch disks 134 and plates 136 against reaction plate 138. Once the clutch disks 134 and plates 136 are engaged, clutch hub 150 rotates with planet carrier and clutch housing 74, 74'.

To disengage rotating clutch 80, the pressurized control oil is allowed to drain from piston recess 116 through the control oil bores 122, 124 and 126 in first deck 110, planet carrier posts 112 and second deck 114, respectively, and out through the control oil bore 142 of seal carrier 140, which allows piston 130 to return to its disengaged position under the restoring force provided by clutch spring 132. When piston 130 disengages, interleaved clutch disks 134 and plates 136 separate, which allows clutch hub 150 to rotate independent of planet carrier and clutch housing 74, 74'.

The many features and advantages of this disclosure are apparent from the detailed specification, and, thus, it is intended by the appended claims to cover all such features and advantages which fall within its true spirit and scope. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of this disclosure.

What is claimed is:

1. A planet carrier and clutch housing for a transmission, comprising:
   a first deck having an inner rim defining a central bore, an outer rim, a plurality of planet shaft bores and a plurality of control oil bores;
   a second deck having an inner rim defining a central bore, an outer rim having a plurality of splines, a piston recess disposed between the inner and outer rims, a plurality of planet shaft bores and a plurality of control oil bores fluidly coupled to the piston recess;
   an annulus, extending from the second deck, including an inner surface defining a central bore, and an outer surface; and
   a plurality of planet carrier posts, connecting the first deck to the second deck, each post having a control oil bore fluidly coupling respective control oil bores in the first and second decks.

2. The planet carrier and clutch housing of claim 1, further comprising:
   a plurality of planet shafts, each shaft including axial and radial lubricating oil bores and extending through respective planet shaft bores in the first and second decks; and
   a planet gear rotationally coupled to each planet shaft.

3. The planet carrier and clutch housing of claim 2, further comprising:
   a seal carrier, attached to the first deck, to restrain the planet shafts and provide control oil to the control oil bores of the first deck; and
   a plurality of dowel pins, one for each planet shaft, to prevent rotation thereof.

4. The planet carrier and clutch housing of claim 1, wherein an inner surface of each second deck planet shaft bore includes a groove to receive a planet shaft seal.

5. The planet carrier and clutch housing of claim 1, further comprising a plate, attached to the annulus, to retain at least one clutch spring.

6. The planet carrier and clutch housing of claim 1, further comprising:
   a reaction plate; and
   a tubular coupler, attached to the splines of the second deck and the reaction plate, including a plurality of clutch plates.

7. The planet carrier and clutch housing of claim 1, wherein the first and second decks each include at least three planet shaft bores and at least three oil control bores, and the plurality of planet carrier posts includes at least three planet carrier posts.

8. The planet carrier and clutch housing of claim 1, wherein the first and second decks include four planet shaft bores and four oil control bores, and the plurality of planet carrier posts includes four planet carrier posts.

9. A planet carrier and clutch assembly for a transmission, comprising:
   a planet carrier and clutch housing, including:
      a first deck having a plurality of planet shaft bores and a plurality of control oil bores,
      a second deck having a piston recess, a plurality of planet shaft bores and a plurality of control oil bores fluidly coupled to the piston recess,
      an annulus extending from the second deck, and
      a plurality of planet carrier posts, connected to the first and second decks, each post having a control oil bore fluidly coupling respective control oil bores in the first and second decks;
   a plurality of planet shafts, each shaft extending through respective planet shaft bores in the first and second decks;
   a planet gear rotationally coupled to each planet shaft;
   a clutch piston, movable within the piston recess, to engage at least one clutch disk; and
   at least one clutch spring, disposed around the annulus, to return the piston to a non-engaged position.

10. The planet carrier and clutch assembly of claim 9, wherein the second deck includes an inner rim defining a central bore and an outer rim having a plurality of splines, and wherein the piston recess is disposed between the inner and outer rims.

11. The planet carrier and clutch assembly of claim 10, wherein the first deck includes an inner rim defining a central bore, and an outer rim having a diameter that is smaller than the diameter of the outer rim of the second deck.

12. The planet carrier and clutch assembly of claim 10, further comprising an outer piston seal disposed between the piston and the outer rim, and an inner piston seal disposed between the piston and the inner rim.

13. The planet carrier and clutch assembly of claim 10, further comprising:
   a reaction plate;
   a tubular coupler, attached to the splines of the second deck and the reaction plate, including a plurality of clutch plates; and
   a clutch hub including a plurality of clutch disks interleaved with the plurality of clutch plates.

14. The planet carrier and clutch assembly of claim 9, wherein the annulus includes an inner surface defining a central bore, and an outer surface around which the clutch spring is disposed.

15. The planet carrier and clutch assembly of claim 14, further comprising a plate, attached to the annulus, to retain the clutch spring.

16. The planet carrier and clutch assembly of claim 9, wherein the planet shafts each include axial and radial lubricating oil bores.

17. The planet carrier and clutch assembly of claim 9, further comprising a planet shaft seal disposed within a groove in an inner surface of each second deck planet shaft bore.

18. The planet carrier and clutch assembly of claim 9, further comprising:
   a seal carrier, attached to the first deck, to restrain the planet shafts and provide control oil to the control oil bores of the first deck; and
   a plurality of dowel pins, one for each planet shaft, to prevent rotation thereof.

19. A method for actuating the clutch in the planet carrier and clutch assembly of claim 9, comprising:
   providing control oil to the first deck control oil bores;
   fluidly coupling the control oil from the first deck control oil bores to the second deck control oil bores through the planet carrier post control oil bores;
   fluidly coupling the control oil from the second deck control oil bores to the second deck piston recess; and
   actuating the clutch piston, disposed in the second deck piston recess, using the control oil.

20. The method of claim 19, further comprising:
   removing the control oil from the second deck piston recess; and returning the clutch piston to a non-actuated state using the clutch spring.

\* \* \* \* \*

UNITED STATES PATENT AND TRADEMARK OFFICE
CERTIFICATE OF CORRECTION

PATENT NO. : 8,961,359 B2
APPLICATION NO. : 13/569139
DATED : February 24, 2015
INVENTOR(S) : Floro et al.

It is certified that error appears in the above-identified patent and that said Letters Patent is hereby corrected as shown below:

IN THE SPECIFICATION

Column 8, line 26, delete "Industrial Applicability" and insert -- INDUSTRIAL APPLICABILITY --.

Signed and Sealed this
Twenty-second Day of December, 2015

Michelle K. Lee
*Director of the United States Patent and Trademark Office*